US008610754B2

(12) United States Patent
Nakazawa

(10) Patent No.: US 8,610,754 B2
(45) Date of Patent: Dec. 17, 2013

(54) IMAGE FORMING APPARATUS WITH MULTIPLE CONTROL MODES

(75) Inventor: Hidehiko Nakazawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 103 days.

(21) Appl. No.: 13/238,644

(22) Filed: Sep. 21, 2011

(65) Prior Publication Data

US 2012/0081496 A1 Apr. 5, 2012

(30) Foreign Application Priority Data

Sep. 30, 2010 (JP) ................................ 2010-220565

(51) Int. Cl.
*B41J 15/14* (2006.01)
*B41J 27/00* (2006.01)

(52) U.S. Cl.
USPC .......................................... 347/243; 347/259

(58) Field of Classification Search
USPC ......... 347/229, 231, 234, 235, 243, 248–250, 347/259–261
See application file for complete search history.

(56) References Cited

U.S. PATENT DOCUMENTS 5,764,270 A * 6/1998 Kitagawa et al. ............. 347/234
6,151,053 A * 11/2000 Watanabe et al. ............. 347/115
7,209,273 B2 * 4/2007 Sobue ........................ 359/216.1
7,236,261 B2 * 6/2007 Motoi et al. ................... 358/1.4
7,391,980 B2 * 6/2008 Sekiguchi et al. .............. 399/20
7,564,205 B2 * 7/2009 Sugimoto ................ 318/400.01
8,026,940 B2 * 9/2011 Kitao et al. .................... 347/261
8,300,074 B2 * 10/2012 Fujise et al. .................. 347/224

FOREIGN PATENT DOCUMENTS

JP 10-035007 A 2/1998
JP 2009-297917 A 12/2009
JP 2009297917 A * 12/2009 ................ B41J 2/44

* cited by examiner

*Primary Examiner* — Hai C Pham
(74) *Attorney, Agent, or Firm* — Scully, Scott, Murphy & Presser, P.C.

(57) ABSTRACT

A light sensor generates a detection signal upon receiving laser light. A rotation sensor generates a rotation signal in synchronization with rotation of a polygon motor. A mirror-rotation-signal generating section generates a mirror rotation signal, based on the detection signal. A motor-rotation-signal generating section generates a motor rotation signal, based on the rotation signal. A phase-difference measuring section measures a phase difference between the motor rotation signal and the mirror rotation signal. A prediction-signal generating section generates a prediction signal that is delayed from the motor rotation signal by the phase difference. A switching section switches a control mode between: a mirror control mode in which the mirror rotation signal is used to control a rotational speed of the polygon mirror; and a prediction control mode in which the prediction signal is used to control the rotational speed. A motor driver drives the polygon motor in the selected control mode.

15 Claims, 6 Drawing Sheets

IMAGE FORMING APPARATUS WITH MULTIPLE CONTROL MODES

CROSS REFERENCE TO RELATED APPLICATIONS

This application claims priority from Japanese Patent Application No. 2010-220565 filed Sep. 30, 2010. The entire content of the priority application is incorporated herein by reference.

TECHNICAL FIELD

The invention relates to an image forming apparatus that forms an image by exposing a photosensitive member with scanning of laser light to form an electrostatic latent image.

BACKGROUND

Conventionally, an electrophotographic-type image forming apparatus is known that is provided with an exposing device that exposes a photosensitive member with laser light. The exposing device includes a laser diode, a polygon mirror, a polygon motor, and the like. The exposing device deflects laser light emitted from the laser diode by the polygon mirror, another mirror, a lens, etc. and scans a surface of the photosensitive member for exposure. Here, the exposing device blinks laser light in accordance with an image to be printed, thereby exposing the surface of the photosensitive member so that an electrostatic latent image corresponding to the image is formed on the surface.

SUMMARY

The polygon mirror is driven to rotate by the polygon motor. In order to accurately expose the surface of the photosensitive member with laser light deflected by the polygon mirror in accordance with the image to be printed, it is necessary to suppress fluctuations in rotational speed of the polygon mirror as small as possible. In order to suppress fluctuations in the rotational speed of the polygon mirror as small as possible, a known method is to measure the rotational speed of the polygon mirror or the polygon motor with a certain method, and to perform a feedback control of the rotational speed of the polygon motor based on the measured rotational speed.

In one image forming apparatus, for example, a light sensor is provided in a region where laser light deflected by a polygon mirror passes, and rotational speed of a polygon motor is measured based on a cycle with which the light sensor detects laser light. Feedback control of the polygon motor is performed by utilizing the rotational speed of the polygon motor measured this way, so that fluctuations in the rotational speed of the polygon mirror are suppressed as small as possible.

During operations of an image forming apparatus, there is a period during which exposure for image formation is not necessary, but it is necessary to suppress fluctuations in rotational speed of a polygon mirror. An example is a waiting period, in both-side printing, when paper of which the first side is finished with printing passes along a reverse conveying path for printing on the second side.

In conventional technology, it is necessary to continue generating laser light not only during a period when exposure is required, but also during a period when exposure is not necessary but fluctuations in the rotational speed of the polygon mirror need to be suppressed.

Generally, a laser diode has a property that deteriorates gradually in proportion to a period during which laser light is generated. Hence, if laser light is also used for measuring the rotational speed of the polygon motor, a period of generation of laser light increases and deterioration of the laser diode tends to progress faster, compared with a case where laser light is used only for exposure.

In view of the foregoing, it is an object of the invention to provide an image forming apparatus that is capable of reducing a period of generation of laser light from a laser-light generating section, thereby suppressing deterioration of the laser-light generating section.

In order to attain the above and other objects, the invention provides an image forming apparatus. The image forming apparatus includes a laser-light generating section, a polygon mirror, a polygon motor, a light sensor, a rotation sensor, a mirror-rotation-signal generating section, a motor-rotation-signal generating section, a phase-difference measuring section, a prediction-signal generating section, a switching section, and a motor driver. The laser-light generating section is configured to generate laser light. The polygon mirror is configured to deflect the laser light. The polygon motor is configured to rotatably drive the polygon mirror. The light sensor is configured to generate a detection signal upon receiving the laser light deflected by the polygon mirror. The rotation sensor is provided at the polygon motor and is configured to generate a rotation signal in synchronization with rotation of the polygon motor. The mirror-rotation-signal generating section is configured to generate a mirror rotation signal in synchronization with rotation of the polygon mirror, based on the detection signal. The motor-rotation-signal generating section is configured to generate a motor rotation signal in synchronization with rotation of the polygon motor, based on the rotation signal. The phase-difference measuring section is configured to measure a phase difference between the motor rotation signal and the mirror rotation signal The prediction-signal generating section is configured to generate a prediction signal that is delayed from the motor rotation signal by the phase difference. The switching section is configured to switch a control mode between: a mirror control mode in which the mirror rotation signal is used to control a rotational speed of the polygon mirror; and a prediction control mode in which the prediction signal is used to control the rotational speed of the polygon mirror. The motor driver is configured to drive the polygon motor in the control mode selected by the switching section.

According to another aspect, the invention provides an electrophotographic-type image forming apparatus. The electrophotographic-type image forming apparatus includes a photosensitive member, an exposure device, a rotation sensor, a light sensor, and a motor controlling device. The exposure device includes a laser diode configured to generate laser light, a polygon mirror configured to deflect the laser light, and a polygon motor configured to rotatably drive the polygon mirror. The exposure device is configured to irradiate the laser light onto the photosensitive member to expose the photosensitive member. The rotation sensor is configured to output a rotation detection signal upon detecting rotation of the polygon motor. The light sensor is provided at a position at which the laser light deflected by the polygon mirror can be detected, and is configured to output a light detection signal upon detecting the laser light. The motor controlling device is connected with the rotation sensor and with the light sensor. The motor controlling device includes a motor-rotation-signal generating section and a mirror-rotation-signal generating section. The motor-rotation-signal generating section is configured to generate a motor rotation signal indicative of a rotational speed of the polygon motor, based on the rotation detection signal outputted by the rotation sensor. The mirror-rotation-signal generating section is configured to generate a mirror rotation signal indicative of a rotational speed of the polygon mirror, based on the light detection signal outputted by the light sensor. The motor controlling device is configured to control the polygon motor based on a control mode selected from two modes of: a first control mode in which the motor rotation signal is used to control the polygon motor; and a second control mode in which the mirror rotation signal is used to control the polygon motor.

According to still another aspect, the invention provides an image forming apparatus. The image forming apparatus includes a laser-light generating section, a polygon mirror, a polygon motor, a light sensor, a rotation sensor, a controller, and a motor driver. The laser-light generating section generates laser light. The polygon mirror deflects the laser light. The polygon motor rotatably drives the polygon mirror. The light sensor generates a detection signal upon receiving the laser light deflected by the polygon mirror. The rotation sensor is provided at the polygon motor and is configured to generate a rotation signal in synchronization with rotation of the polygon motor. The controller generates a mirror rotation signal in synchronization with rotation of the polygon mirror based on the detection signal, generates a motor rotation signal in synchronization with rotation of the polygon motor based on the rotation signal, measures a phase difference between the motor rotation signal and the mirror rotation signal, generates a prediction signal that is delayed from the motor rotation signal by the phase difference, and switches a control mode between: a mirror control mode in which the mirror rotation signal is used to control a rotational speed of the polygon mirror; and a prediction control mode in which the prediction signal is used to control the rotational speed of the polygon mirror. The motor driver drives the polygon motor in the control mode determined by the controller.

BRIEF DESCRIPTION OF THE DRAWINGS

Embodiments in accordance with the invention will be described in detail with reference to the following figures wherein.

DETAILED DESCRIPTION

Figure 1:
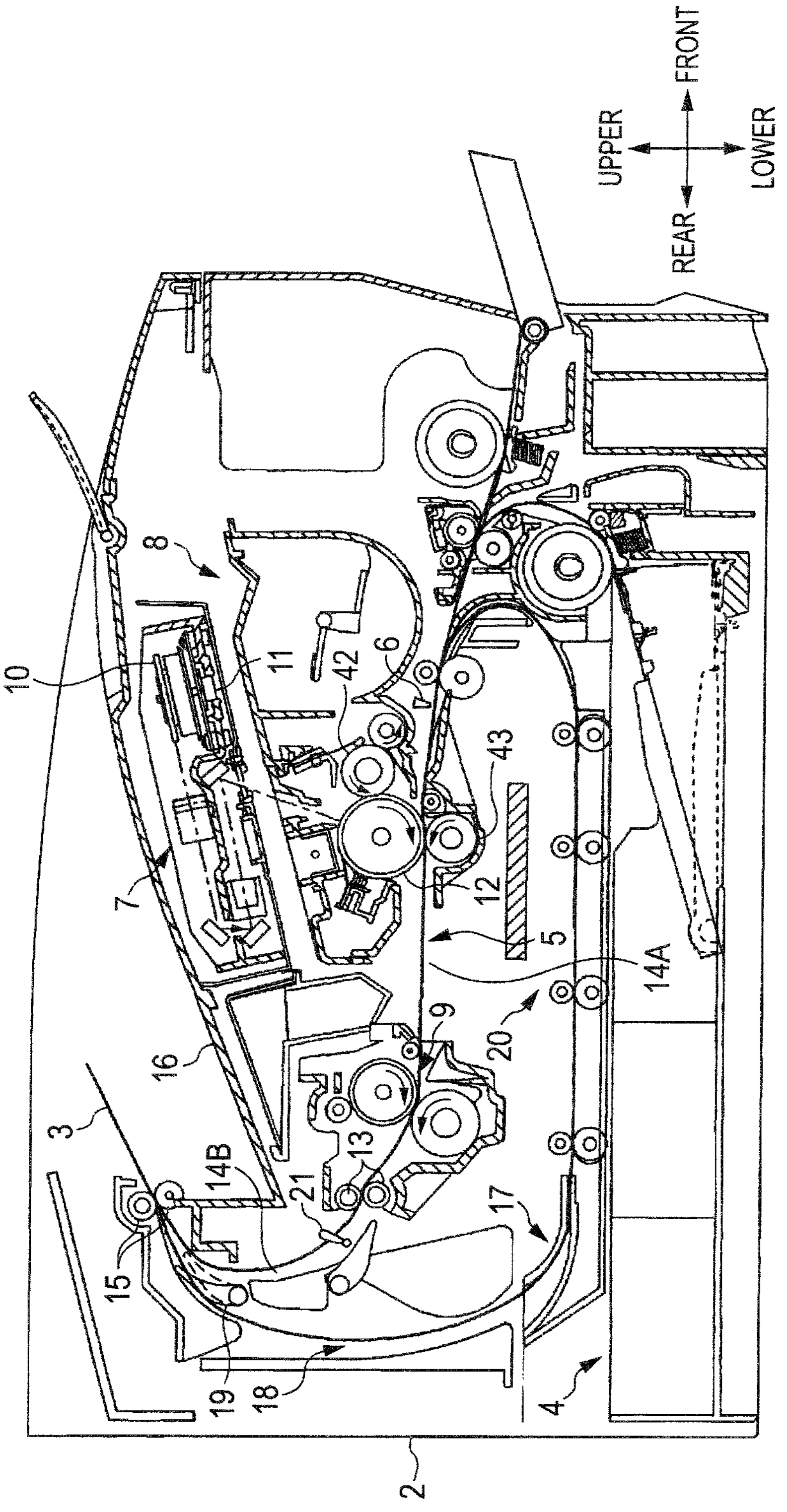
FIG. 1 is a vertical cross-sectional view showing the internal structure of an entirety of a laser printer according to an embodiment of the invention.

An image forming apparatus according to an embodiment of the invention will be described while referring to the accompanying drawings. The image forming apparatus of the embodiment is applied to a laser printer 1. In the following description, as shown in FIG. 1, the expressions "front", "rear", "upper", and "lower" are used to define the various parts when the laser printer 1 is disposed in an orientation in which it is intended to be used.

<Internal Structure of Laser Printer>

The laser printer 1 includes a main frame 2 and, within the main frame 2, includes a feeder section 4 for feeding paper 3, an image forming section 5 for forming an image on fed paper 3, and the like. The paper 3 in the present embodiment is one example of a recording medium.

In the laser printer 1, paper 3 is picked up from the feeder section 4, and is conveyed to the image forming section 5. A paper-feed detection sensor 6 is provided between the feeder section 4 and the image forming section 5. The paper-feed detection sensor 6 detects passage of the leading edge of the paper 3, and outputs a paper-feed detection signal to a CPU 24 to be described later. The CPU 24 utilizes timing at which the paper-feed detection signal is received from the paper-feed detection sensor 6 as reference timing of an image forming process to be described later.

Figure 2:
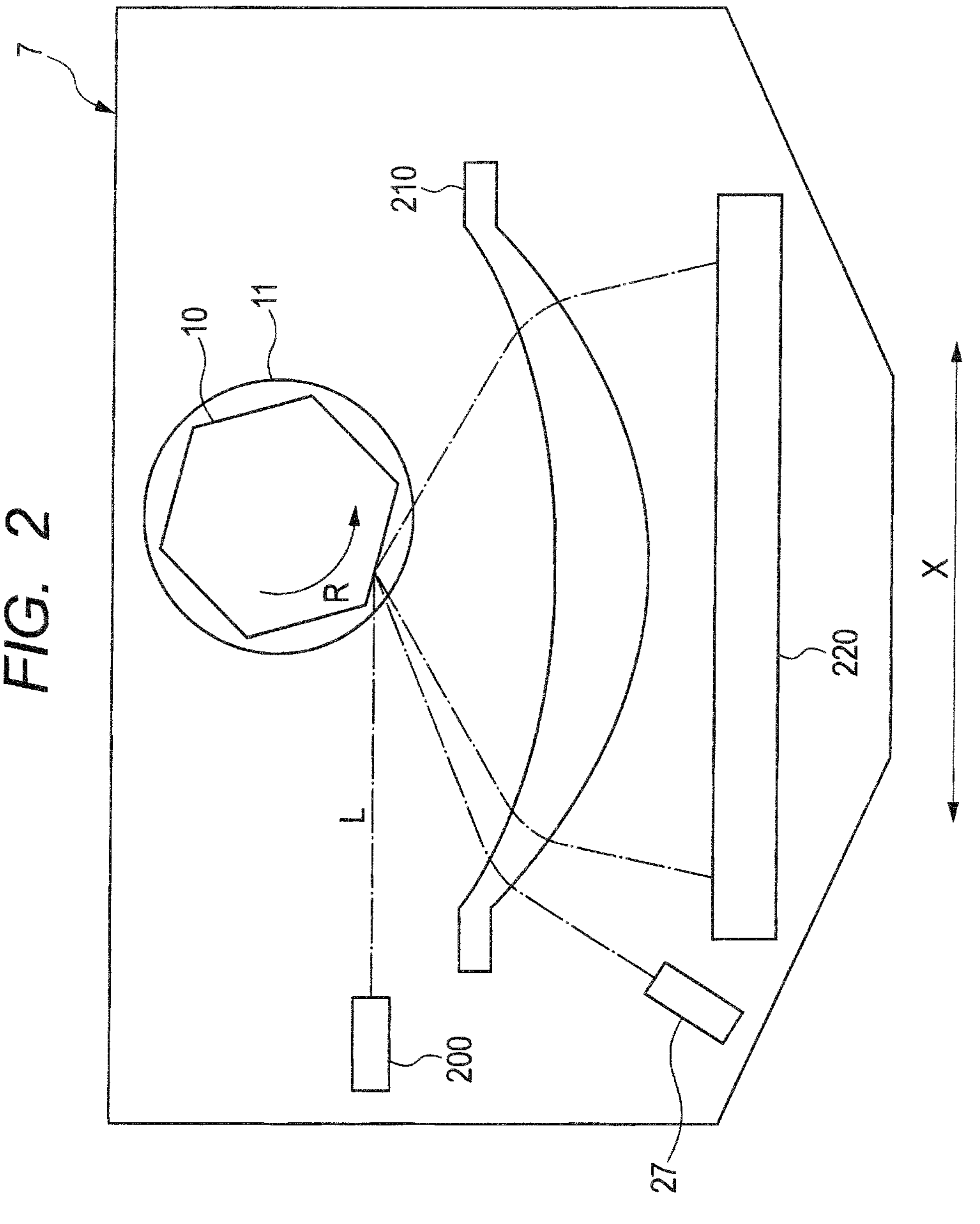
FIG. 2 is a schematic view showing the structure of a scanner section of the laser printer according to the embodiment.

The image forming section 5 includes a scanner section 7 and a process cartridge 8. The scanner section 7 is described with reference to FIG. 2. The scanner section 7 is provided at an upper part within the main frame 2. As shown in FIG. 2, the scanner section 7 includes a laser diode (LD) 200, a polygon mirror 10, a polygon motor 11, an Fθ lens 210, a mirror 220, and the like. The laser diode 200 generates laser light L. The polygon mirror 10 deflects laser light L, while rotating in a rotational direction R. The polygon motor 11 rotatably drives the polygon mirror 10. As shown by the single-dot chain lines, in the scanner section 7, laser light generated by the laser diode 200 is irradiated on a surface of a photosensitive member 12 (FIG. 1) via the polygon mirror 10, the Fθ lens 210, and the mirror 220, so that the laser light scans the surface of the photosensitive member 12 in a main scanning direction X.

The scanner section 7 is also provided with a light sensor (beam detector) 27 capable of detecting laser light reflected by the polygon mirror 10. The BD sensor 27 is placed at such a position that the light sensor 27 can detect reflected light when the polygon mirror 10 is at a predetermined angle. In this example, because the polygon mirror 10 having six surfaces (reflection surfaces) is used, reflected light is detected six times per rotation. The light sensor 27 outputs a light detection signal upon detecting the reflected light.

Thus, a state of rotation of the polygon mirror 10 can be known by generating laser light from the laser diode 200 and observing how the light detection signal from the light sensor 27 changes. The light detection signal is used for detecting a position of start of scan of laser light. More specifically, timing at which the light sensor 27 detects laser light is regarded as timing at which the laser light is at the position of start of scan, and the following processes (modulation of laser light etc.) are performed.

Returning to FIG. 1, descriptions of the image forming section 5 will be continued.

The scanner section 7 scans the surface of the photosensitive member 12 of the process cartridge 8 with laser light, so that an electrostatic latent image is formed on the surface of the photosensitive member. A developing roller 42 supplies the photosensitive member 12 with developer to develop the electrostatic latent image, thereby forming a developer image. A transfer roller 43 is disposed below the photosensitive member 12 so as to confront the photosensitive member 12. During a transfer operation, in the image forming section 5, a predetermined transfer bias voltage is applied between the transfer roller 43 and the photosensitive member 12, so that the developer image is transferred onto the paper 3.

In the laser printer 1, the paper 3 on which an image has been formed by the image forming section 5 passes a fixing section 9, and is subsequently conveyed along a discharging path 14B by driving of conveying rollers 13. The paper 3 conveyed along the discharging path 14B is sent to discharging rollers 15. After the trailing edge of the paper 3 is detected by a paper-discharge detection sensor 21, the paper 3 is discharged onto a discharging tray 16 by the discharging rollers 15.

Further, as shown in FIG. 1, the laser printer 1 is provided with a reverse conveying section 17 for reversing the paper 3 of which one side is formed with an image and for conveying the reversed paper 3 to the image forming section 5 again. The reverse conveying section 17 includes the discharging rollers 15, a flapper 19, a plurality of reverse conveying rollers 20, and the like. A reverse conveying path 18 is formed in the reverse conveying section 17. When printing is to be performed on both sides of paper 3, first, an image is formed on one side (first side) of the paper 3, and the paper 3 is conveyed to the discharging rollers 15 along a conveying path 14A and the discharging path 14B. Then, the paper 3 is conveyed to the image forming section 5 via the flapper 19, the reverse conveying path 18, and the plurality of reverse conveying rollers 20 by reverse rotations of the discharging rollers 15. In this way, the two sides of the paper 3 are reversed and an image is formed on the other side (second side) of the paper 3. The timing at which the discharging rollers 15 rotate in the reverse direction is calculated by using a period that elapses from when the paper-discharge detection sensor 21 outputs a paper-discharge detection signal until when the trailing edge of the paper 3 passes the flapper 19.

<Configuration of Motor Controlling Device>

Figure 3:
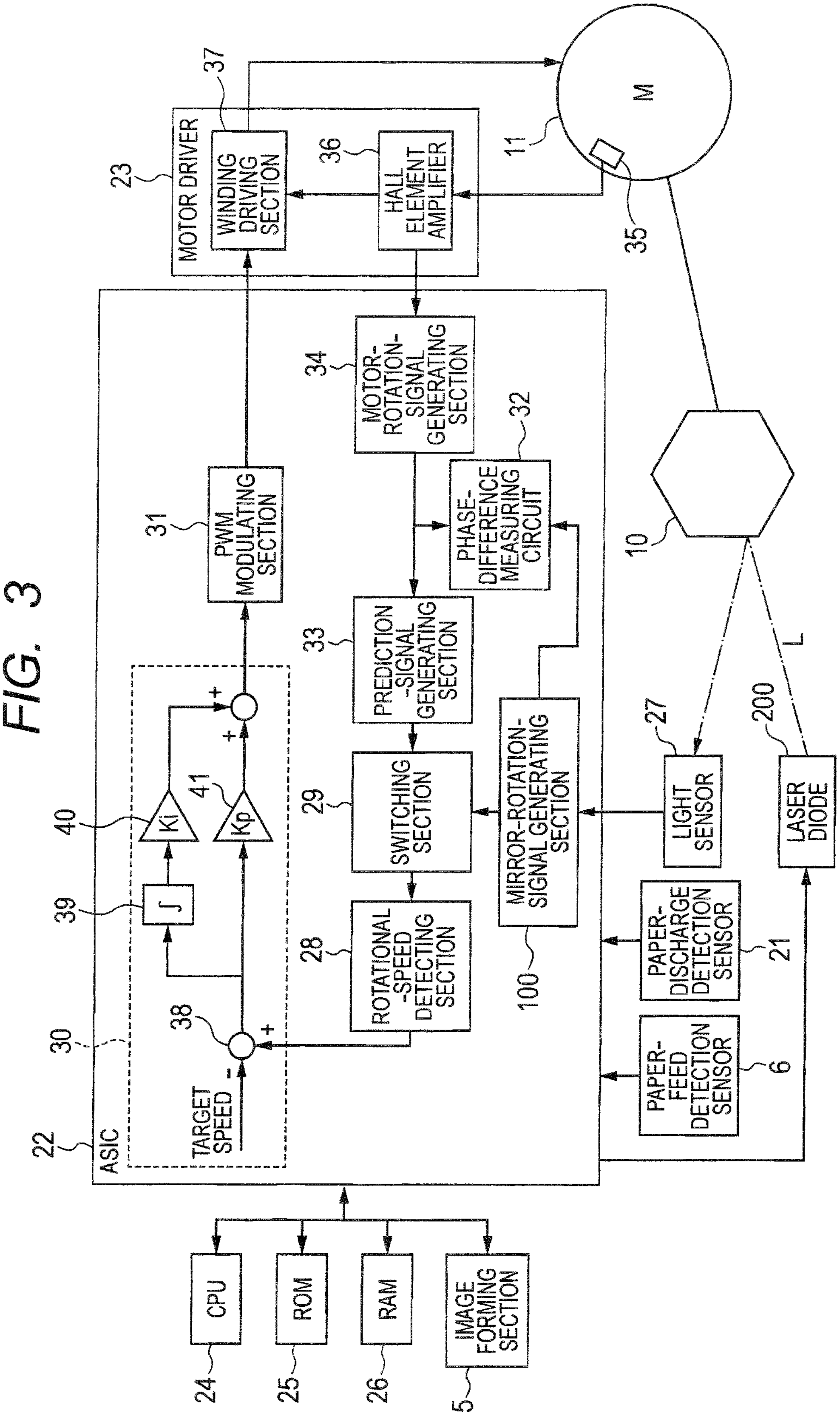
FIG. 3 is a block diagram schematically illustrating the overall configuration of a motor controlling device according to the embodiment.

Next, a motor controlling device that drives the above-mentioned polygon motor 11 will be described with reference to FIG. 3. As shown in FIG. 3, the motor controlling device includes an ASIC (Application Specific Integrated Circuit) 22 and a motor driver 23.

The motor driver 23 is configured to control rotational speed of the polygon motor 11 based on a speed control signal from the ASIC 22. The ASIC 22 is connected with a CPU 24, a ROM 25, a RAM 26, the image forming section 5, and the like. The ROM 25 stores various programs executed on the laser printer 1 (including a program that performs controls of the polygon motor 11). The CPU 24 executes the various programs.

As shown in FIG. 3, the polygon motor 11 is provided with a Hall element 35, The Hall element 35 outputs a Hall element signal based on a rotational angle of a rotor of the polygon motor 11. The motor driver 23 includes a Hall element amplifier 36 that amplifies the Hall-element signal. The Hall-element signal amplified by the Hall element amplifier 36 is outputted to a motor-rotation-signal generating section 34 and a winding driving section 37 described later.

The polygon motor 11 is a three-phase twelve-pole brushless DC motor in the present embodiment. Motor windings of the polygon motor 11 are formed as three-phase star connection (not shown). On the other hand, the Hall element 35 is arranged around the rotor of the polygon motor 11. The signal outputted from the Hall element 35 is inputted to the Hall element amplifier 36. The motor driver 23 controls electric power supplied to the windings of the polygon motor 11, based on the Hall element signal sent from the Hall element amplifier 36 and on a PWM signal sent from a PWM modulating section 31 described later.

The configuration of the ASIC 22 will be described with reference to FIG. 3. The ASIC 22 includes the motor-rotation-signal generating section 34, a mirror-rotation-signal generating section 100, a phase-difference measuring circuit 32, a prediction-signal generating section 33, a switching section 29, a rotational-speed detecting section 28, a feedback controlling section 30, the PWM modulating section 31, and the like. The rotational-speed detecting section 28 detects rotational speed of the polygon motor 11. The feedback controlling section 30 generates a rotational-speed command value based on the rotational speed of the polygon motor 11 and a target speed. The PWM modulating section 31 converts the rotational-speed command value into the PWM signal and outputs the PWM signal to the winding driving section 37.

The motor-rotation-signal generating section 34 generates a motor rotation signal that falls from High to Low once per rotation of the rotor of the polygon motor 11, based on the Hall-element signal sent from the Hall clement amplifier 36. The motor rotation signal generated by the motor-rotation-signal generating section 34 is outputted to the phase-difference measuring circuit 32 and the prediction-signal generating section 33.

Note that, in the present embodiment, the motor-rotation-signal generating section 34 detects rotation of the polygon motor 11 by using the Hall-element signal, and generates the motor rotation signal. However, the motor-rotation-signal generating section 34 may detect rotation of the rotor of the polygon motor 11 by measuring back electromotive force generated in motor windings of the polygon motor 11, and generate the motor rotation signal that falls from High to Low once per rotation of the rotor of the polygon motor 11, without using the Hall-element signal.

The mirror-rotation-signal generating section 100 generates a mirror rotation signal that falls from High to Low once per rotation of the polygon motor 11 based on the detection signal outputted from the light sensor 27, in a state where laser light is generated from the laser diode 200.

Because the polygon mirror 10 with six surfaces is used in this example, the light sensor 27 detects reflected light six times per rotation of the polygon mirror 10. Hence, the mirror-rotation-signal generating section 100 generates the mirror rotation signal that falls from High to Low once, each time a light detection signal indicative of detection of reflected light is inputted from the light sensor 27 six times.

The mirror rotation signal generated by the mirror-rotation-signal generating section 100 is outputted to the switching section 29 and to the phase-difference measuring circuit 32.

In order to generate the mirror rotation signal by the mirror-rotation-signal generating section 100, it is necessary to generate laser light from the laser diode 200. Hence, in the present embodiment, the laser diode 200 is lighted on (turned on) at earlier timing than the light detection signal is generated, so that the light detection signal is generated reliably.

The phase-difference measuring circuit 32 is a circuit that measures a phase difference between the motor rotation signal inputted from the motor-rotation-signal generating section 34 and the mirror rotation signal inputted from the mirror-rotation-signal generating section 100. Upon receiving a command to measure the phase difference TP from the CPU 24 (see step S103 in FIG. 5), the phase-difference measuring circuit 32 measures the phase difference between the motor rotation signal and the mirror rotation signal, and stores the phase difference in the RAM 26.

The phase difference TP between the motor rotation signal and the mirror rotation signal is a period that elapses from a time point when falling of the motor rotation signal from High to Low is detected until a time point when falling of the mirror rotation signal from High to Low is detected.

The prediction-signal generating section 33 generates a prediction signal that is obtained by delaying the inputted motor rotation signal by the phase difference TP, and outputs the prediction signal to the switching section 29 described later.

Figure 4:
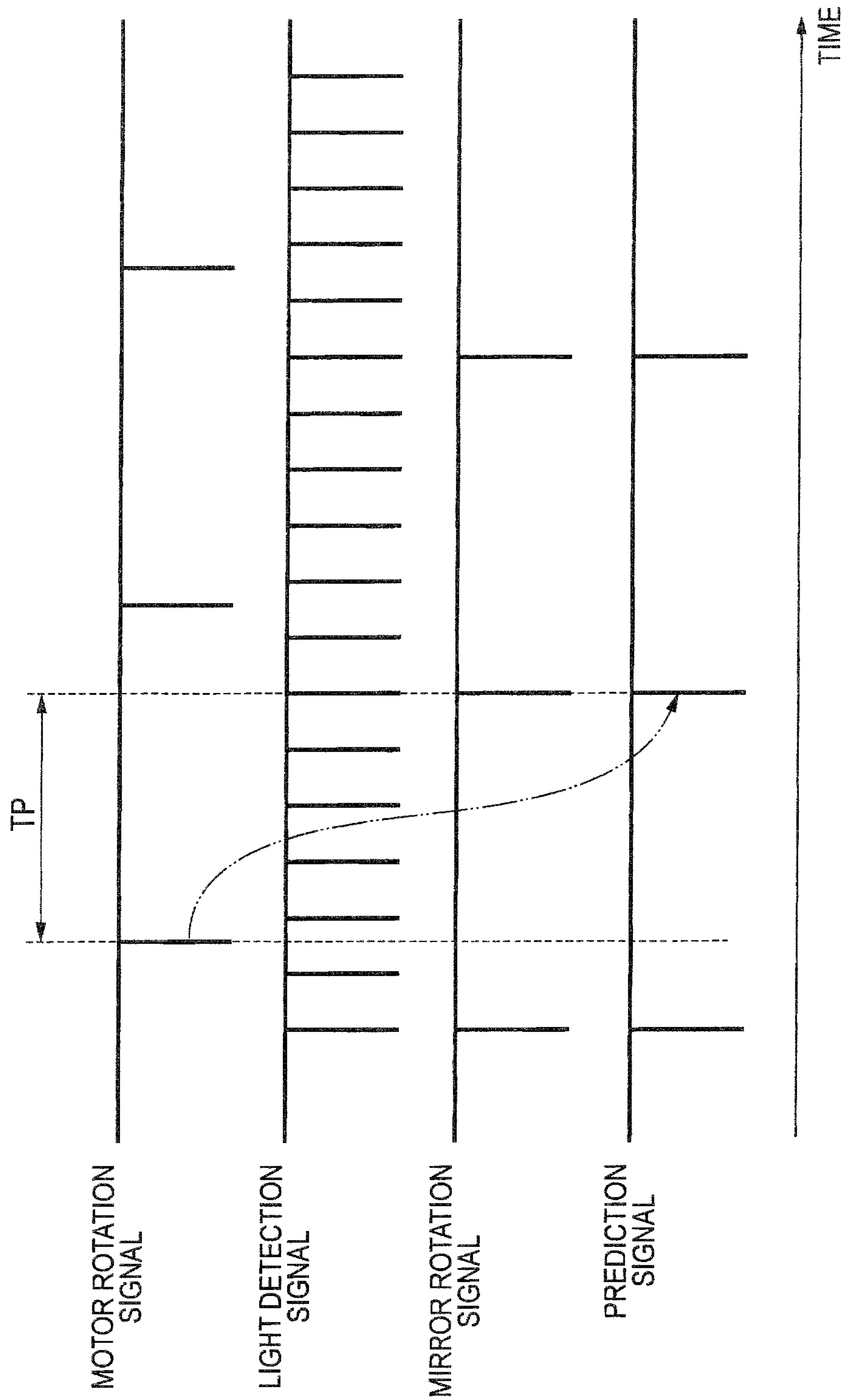
FIG. 4 is a waveform chart (timing chart) showing relationships among a motor rotation signal, a light detection signal, a mirror rotation signal, a prediction signal, and a phase difference TP.

FIG. 4 shows relationships of timings at which respective pulses of the motor rotation signal, the light detection signal, the mirror rotation signal, and the prediction signal are generated. As shown by the double-dot chain curve in FIG. 4, the prediction signal is generated by delaying the motor rotation signal by the phase difference TP. That is, the prediction signal falls from High to Low at delayed timing from the motor rotation signal by the phase difference TP. Thus, the prediction signal is a signal that falls from High to Low at the same timing as the mirror rotation signal. In other words, the phase of the motor rotation signal is shifted (adjusted) to match the phase of the mirror rotation signal if the phase difference TP exists. Hence, the polygon motor 11 can be controlled by using the prediction signal, instead of the mirror rotation signal.

In the present embodiment, the prediction signal is generated by generating both the motor rotation signal and the mirror rotation signal so that the both signals have the same cycle, and by adjusting the phase difference. Here, it is only necessary that the motor rotation signal and the mirror rotation signal have the same cycle. The number of times of falling from High to Low per rotation of the polygon motor 11 or the polygon mirror 10 may be different from six (6). Here, the number of times can be selected so that the motor rotation signal and the mirror rotation signal have the same cycle, based on the number of phases of the polygon motor 11 and on the number of surfaces of the polygon mirror.

Note that the motor rotation signal is a signal including, per unit time, a number of pulses that is proportional to the rotational speed of the polygon motor 11, and the mirror rotation signal is a signal including, per unit time, a number of pulses that is proportional to the rotational speed of the polygon mirror 10. As described above, both of the motor rotation signal and the mirror rotation signal have the same cycle. Thus, the number of pulses of the motor rotation signal that are generated per rotation of the polygon motor 11 (one in the present embodiment) is equal to the number of pulses of the mirror rotation signal that are generated per rotation of the polygon mirror 10 (one in the present embodiment).

Referring again to FIG. 3, the switching section 29 is connected with the rotational-speed detecting section 28, the prediction-signal generating section 33, and the mirror-rotation-signal generating section 100. The switching section 29 is inputted with the mirror rotation signal generated by the mirror-rotation-signal generating section 100 and the prediction signal generated by the prediction-signal generating section 33. The switching section 29 outputs either one of the mirror rotation signal and the prediction signal to the rotational-speed detecting section 28, based on a command from the CPU 24.

Hereinafter, a mirror control mode refers to a mode in which the mirror rotation signal is selected by the switching section 29, so that the mirror rotation signal is inputted to the rotational-speed detecting section 28 for controlling rotation of the polygon motor 11. In contrast, a prediction control mode refers to a mode in which the prediction signal is selected by the switching section 29, so that the prediction signal is inputted to the rotational-speed detecting section 28 for controlling rotation of the polygon motor 11. The CPU 24 switches which of the mirror rotation signal and the prediction signal is outputted to the rotational-speed detecting section 28 by the switching section 29, thereby performing switching between the mirror control mode and the prediction control mode.

The rotational-speed detecting section 28 counts the number by which the inputted signal (the mirror rotation signal or the prediction signal) falls from High to Low within a predetermined period, thereby detecting the rotational speed of the polygon motor 11, and outputs the rotational speed to the feedback controlling section 30.

The feedback controlling section 30 includes a subtracter 38, an integrator 39, an integration calculator 40, a proportion calculator 41, and the like. The subtracter 38 obtains rotational-speed deviation between the current rotational speed detected by the rotational-speed detecting section 28 and a target rotational speed. The integrator 39 obtains an integrated value of the rotational-speed deviation. The integration calculator 40 calculates an integration control value by multiplying the integrated value of the rotational-speed deviation by a predetermined integration gain. The proportion calculator 41 calculates a proportion control value by multiplying the rotational-speed deviation by a predetermined proportion gain. Then, a sum of the integration control value and the proportion control value is calculated as a rotational-speed command value (feedback signal). The rotational-speed command value is outputted to the PWM modulating section 31.

The PWM modulating section 31 converts a PWM signal generated based on the rotational-speed command value into the speed control signal, and outputs the speed control signal to the winding driving section 37 of the motor driver 23. The motor driver 23 supplies the windings of the polygon motor 11 with predetermined power based on the PWM signal and on a signal from the Hall element amplifier 36, thereby controlling the rotational speed of the polygon motor 11.

<Operation of Laser Printer 1>

Next, an operation of the laser printer 1 during both-side printing will be described with reference to FIGS. 5 and 6. Here, a reverse conveying period is a period, at both-side printing, from when printing on a first side of the paper 3 is finished until when the paper 3 is conveyed to the image forming section 5 in a reversed state and printing on a second side of the paper 3 is started.

Figure 6:
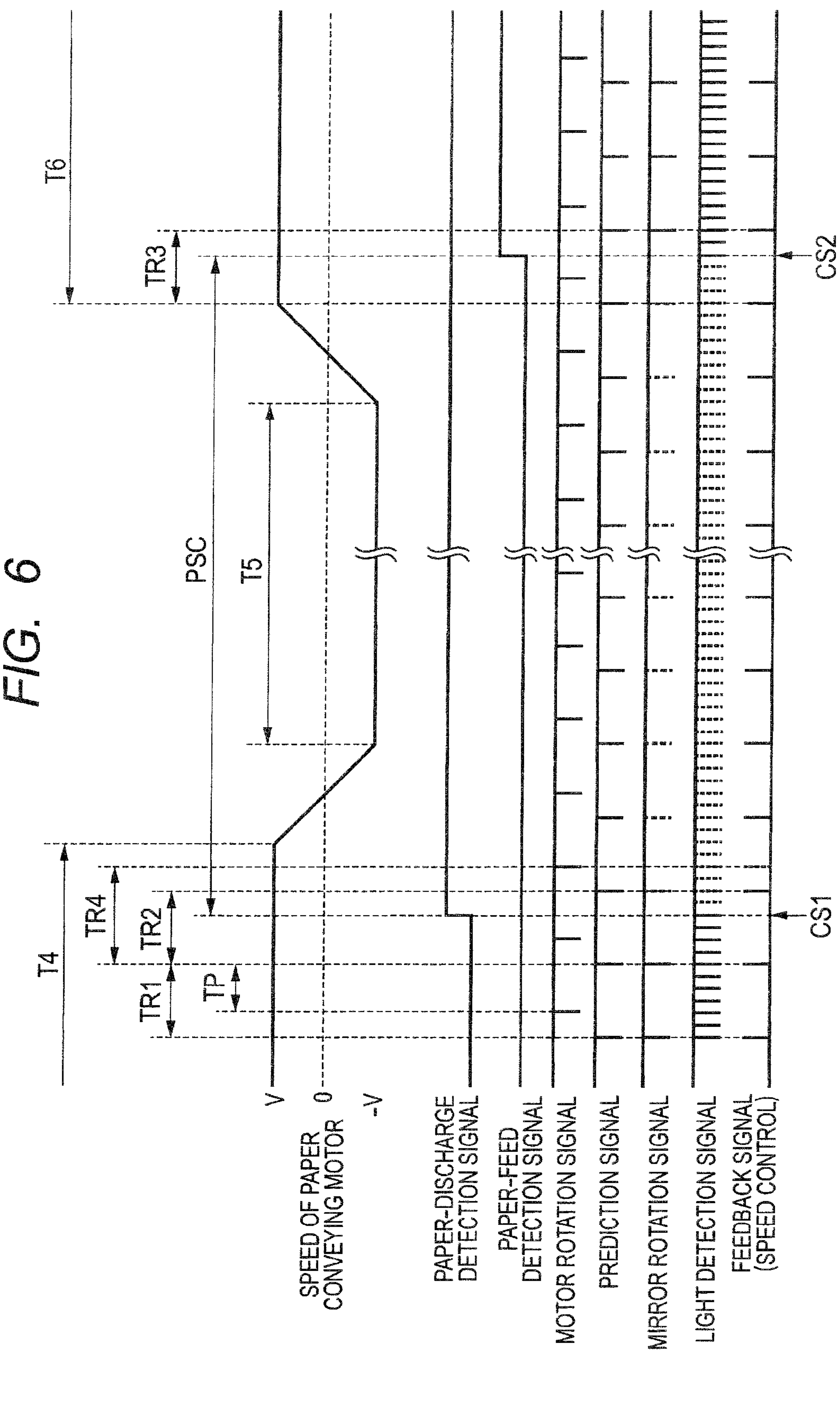
FIG. 6 is a waveform chart (timing chart) showing changes of each control signal when a switching control according to the embodiment is applied to a reverse conveying operation in both-side printing.

Note that, in FIG. 6, the thick solid lines indicate actual signal lines, whereas the thick dotted lines (appearing at "MIRROR ROTATION SIGNAL", "LIGHT DETECTION SIGNAL" and "FEEDBACK SIGNAL (SPEED CONTROL)" rows) indicate imaginary signal lines that actually do not exist.

Figure 5:
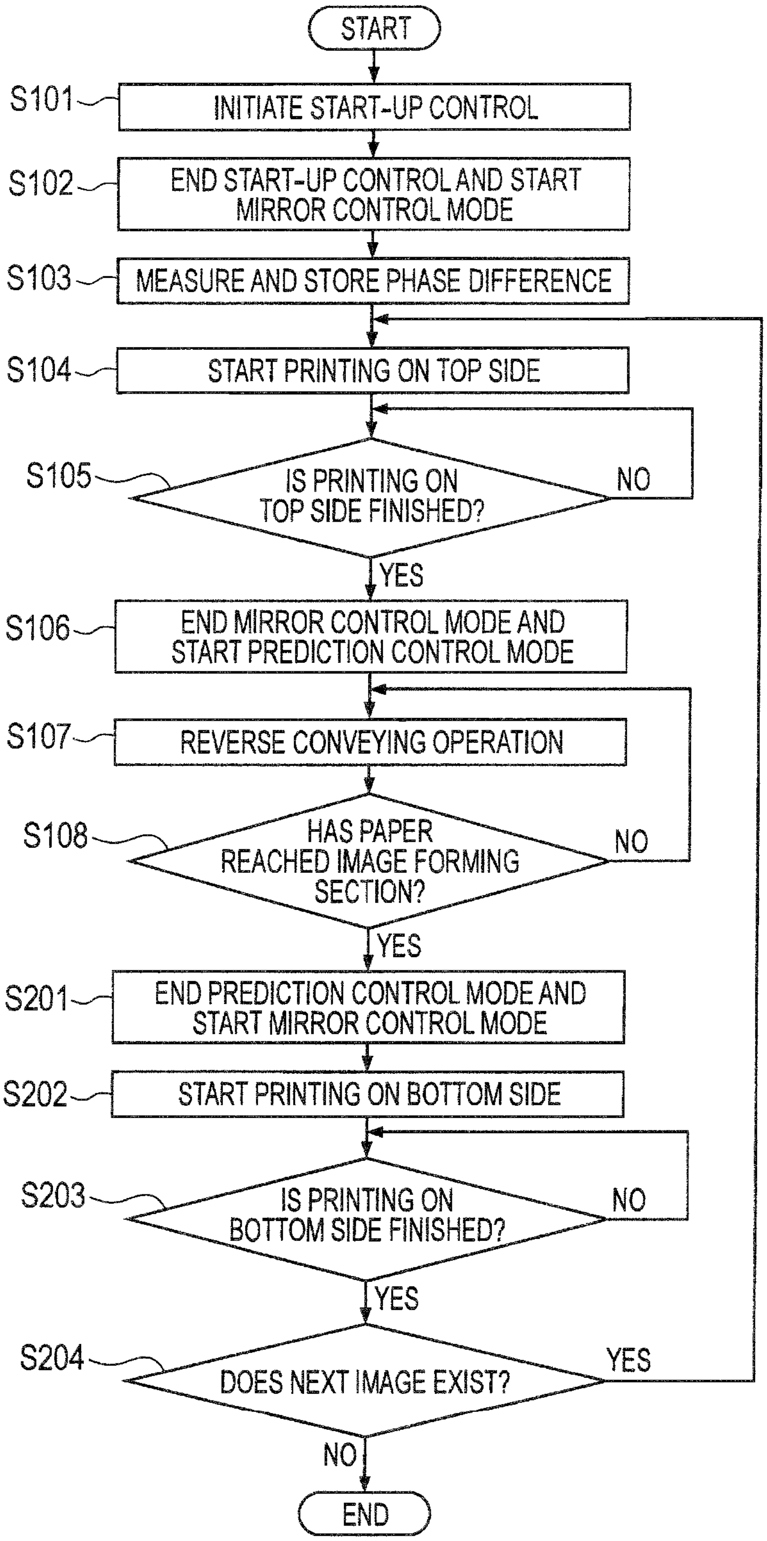
FIG. 5 is a flowchart showing steps performed by the laser printer in both-side printing.

When a request for both-side printing is inputted to the laser printer 1 from a user, the CPU 24 starts a program in accordance with the flowchart shown in FIG. 5. First, in S101, the CPU 24 initiates a start-up control for starting rotation of the polygon motor 11 that is waiting in a stopped state.

Generally, it is necessary to stop irradiation of laser light when the polygon motor 11 is stopped and when the rotational speed of the polygon motor 11 is lower than a predetermined speed (and hence the speed at which laser light scans a photosensitive member is lower than a predetermined value), in order to prevent deterioration of the photosensitive member due to irradiation of laser light. The mirror rotation signal is not obtained when irradiation of laser light is stopped.

Thus, at the time of starting rotation of the polygon motor 11, the prediction signal is used for detecting whether the polygon motor 11 has reached a predetermined speed after starting rotation. However, because the mirror rotation signal is not yet obtained at this stage, the phase difference TP cannot be obtained. Hence, at the time of starting rotation of the polygon motor 11, the rotational speed of the polygon motor 11 is detected by using the prediction signal that is generated assuming TP=0 (that is, the motor rotation signal itself).

The CPU 24 proceeds to S102 if it is confirmed that the rotational speed of the polygon motor 11 has reached the predetermined speed (target speed).

In S102, the CPU 24 lights on the laser diode 200. Once the laser diode 200 is lighted on, the light detection signal which is the source of the mirror rotation signal can be obtained. That is, the mode can be switched to the mirror control mode in which the rotational speed of the polygon motor 11 is detected based on the mirror rotation signal for performing feedback control. If the rotational speed of the polygon motor 11 reaches the predetermined speed so that the mirror rotation signal can be used as a signal for speed detection, the CPU 24 switches the signal for speed detection from the motor rotation signal to the mirror rotation signal, and controls the rotational speed of the polygon motor 11.

In S103, when the rotational speed of the polygon motor 11 is stabilized after being switched to the mirror control mode, the CPU 24 sends a command to measure the phase difference TP to the phase-difference measuring circuit 32, and then reads the phase difference TP measured by the phase-difference measuring circuit 32 and stores the value in the RAM 26. As described above, the phase difference TP is a period that elapses from a time point when the motor rotation signal falls from High to Low until a time point when the mirror rotation signal falls from High to Low. The prediction-signal generating section 33 generates the prediction signal that predicts output timing of the mirror rotation signal, by using the phase difference TP stored in this process. In the present embodiment, the prediction-signal generating section 33 generates the prediction signal by delaying the motor rotation signal by the phase difference TP, as shown by the double-dot chain curve in FIG. 4. That is, the prediction signal is outputted as a signal that falls from High to Low at a time point that is elapsed (delayed) by the phase difference TP from a time point when the motor rotation signal falls from High to Low.

In S104, the CPU 24 starts printing on the top side of the paper 3. As shown in FIG. 6, during a period T4, the CPU 24 controls the polygon motor 11 to convey the paper 3 while performing top-side printing.

In S105, the CPU 24 determines whether printing on the top side is finished, by determining whether the paper-discharge detection sensor 21 has detected the trailing edge of the paper 3. More specifically, the CPU 24 determines whether the paper-discharge detection sensor 21 has outputted a paper-discharge detection signal. A first detection timing CS1 in FIG. 6 is timing when the paper-discharge detection sensor 21 outputs the paper-discharge detection signal. The first detection timing CS1 functions as a trigger for the CPU 24 to switch the control mode from the mirror control mode to the prediction control mode. Based on this timing, the CPU 24 determines a time point at which printing on the top side is finished.

If printing on the top side is not finished (S105: No), the CPU 24 repeats the process in S105 until printing on the top side is finished. If printing on the top side is finished (S105: Yes), the CPU 24 proceeds to S106.

In S106, the CPU 24 switches the control mode from the mirror control mode to the prediction control mode, so that the rotational speed of the polygon motor 11 is controlled based on the prediction signal. When the CPU 24 switches to the prediction control mode, the switching section 29 switches the signal to be outputted to the rotational-speed detecting section 28 from the mirror rotation signal to the prediction signal. That is, the control based on the prediction signal is started, and the control based on the mirror rotation signal ends. Subsequently, the CPU 24 temporarily stops lighting of the laser diode 200.

As shown in FIG. 6, during a prediction-signal controlling period PSC from the first detection timing CS1 until a second detection timing CS2, the feedback controlling section 30 outputs the feedback signal based on input of the prediction signal so as to control the rotational speed of the polygon motor 11. The CPU 24 stops the lighting signal of the laser diode 200 from the first detection timing CS1 until the second detection timing CS2.

After the first detection timing CS1, the feedback controlling section 30 outputs the feedback signal with a detection cycle TR2 of the prediction signal. At this time, if the input is switched from the mirror rotation signal to the motor rotation signal, not the prediction signal, the feedback signal is not outputted until a rising edge of the motor rotation signal is detected. Hence, an output cycle of the feedback signal would be a detection cycle TR4 of the motor rotation signal which is longer than the detection cycle TR1. If the detection cycle is long, it is determined that rotation of the polygon motor 11 is slow, and the polygon motor 11 is controlled to rotate faster, which can lead to large fluctuations in the rotational speed of the polygon motor 11.

In S107, the paper 3 of which the top side is printed is reversed and conveyed. As shown in FIG. 6, rotation of the paper conveying motor is reversed during a period T5 so that the paper 3 is conveyed in a reversed state. During this reverse conveying operation, lighting of the laser diode 200 is stopped temporarily, and unnecessary lighting of the laser diode 200 can be reduced.

In S108, the CPU 24 determines whether the leading edge of the paper 3 of which the top side is formed with an image has reached the image forming section 5, by determining whether the paper-feed detection sensor 6 has outputted a paper-feed detection signal. As shown in FIG. 6, the second detection timing CS2 is timing at which the leading edge of the paper 3 is conveyed to the image forming section 5 after the paper 3 is reversed, and the paper-feed detection sensor 6 outputs the paper-feed detection signal. The second detection timing CS2 functions as a trigger for the CPU 24 to switch the control mode from the prediction control mode to the mirror control mode. Based on this timing, the CPU 24 determines a time point at which the leading edge of the paper 3 reaches the image forming section 5.

If the CPU 24 determines that the leading edge of the paper 3 has not reached the image forming section 5 (S108: No), the CPU 24 repeats the process in S107. If the CPU 24 determines that the leading edge of the paper 3 has reached the image forming section 5 (S108: Yes), the CPU 24 proceeds to S201.

In S201, the CPU 24 first starts lighting of the laser diode 200 so that the mirror rotation signal is inputted to the switching section 29. Subsequently, the CPU 24 switches the control mode from the prediction control mode to the mirror control mode, so that the rotational speed of the polygon motor 11 is controlled based on the mirror rotation signal. The CPU 24 controls the switching section 29 to switch the output signal from the prediction signal to the mirror rotation signal.

After the second detection timing CS2, the feedback controlling section 30 outputs the feedback signal with a detection cycle TR3 based on input of the mirror rotation signal so as to control the rotational speed of the polygon motor 11.

In S202, printing on the bottom side of the paper 3 is started. As shown in FIG. 3, printing on the bottom side is performed during a period T6 while being conveyed, and both-side printing on one sheet of the paper 3 is finished.

In S203, the CPU 24 determines whether printing on the bottom side is finished, based on whether the paper-discharge detection sensor 21 has detected the trailing edge of the paper 3. If printing on the bottom side is not finished (S203: No), the CPU 24 repeats the process in S203 until printing on the bottom side is finished. When printing on the bottom side is finished (S203: Yes), the CPU 24 proceeds to S204.

In S204, the CPU 24 determines whether there is an image to be printed on the next paper. If the image exists (S204: Yes), the CPU 24 returns to the process in S 104. If the image does not exist (S204: No), the CPU 24 ends the processes in the flowchart.

<Advantageous Effects>

In the above-described embodiment, during periods in which laser light for image formation is not necessary, such as during a reverse conveying operation of the paper 3, the control mode is switched from the mirror control mode to the prediction control mode, so that the laser diode 200 can be turned off while controlling the rotational speed of the polygon mirror 10. Accordingly, a lighting period of the laser diode 200 can be shortened to suppress consumption (deterioration) of the laser diode 200 due to lighting.

In the above-described embodiment, the control mode is switched from the mirror control mode to the prediction control mode at the start of the reverse conveying operation, and then the laser diode 200 is turned off. Thus, a lighting period of the laser diode 200 can be shortened to suppress deterioration of the laser diode 200.

Because the prediction signal is generated from the motor rotation signal that changes in accordance with fluctuations in the rotational speed of the polygon motor 11, fluctuations in the rotational speed of the polygon motor 11 can be known from changes in the prediction signal. Hence, even when fluctuations occur in the rotational speed of the polygon motor 11 during the reverse conveying operation, such as when an impact is applied to the laser printer 1 from outside, a feedback control can be performed to suppress the fluctuations in the rotational speed of the polygon motor 11, based on changes in the prediction signal.

<Modifications>

While the invention has been described in detail with reference to the above aspects thereof, it would be apparent to those skilled in the art that various changes and modifications may be made therein without departing from the scope of the claims.

For example, in the above-described embodiment, the rotational speed of the polygon motor 11 is controlled based on the prediction signal during the reverse conveying operation. It is also possible, in a printing job including a plurality of pages (sheets), to control the rotational speed of the polygon motor 11 based on output of the prediction signal after printing is completed on one sheet and before the next sheet is conveyed.

In the above-described embodiment, whether printing on the top side is finished is determined based on whether the paper-discharge detection sensor 21 has detected the trailing edge of the paper 3. However, it may be determined based on whether a predetermined period has elapsed after the paper-discharge detection sensor 21 detects the leading edge of the paper 3. The predetermined period is a period in which a transfer operation is presumed to be finished according to the size of the paper 3. Alternatively, whether printing on the top side is finished may be determined based on whether a predetermined period has elapsed after the paper-feed detection sensor 6 detects the trailing edge of the paper 3. The timing of turning off the laser diode may be changed appropriately, as long as it is after a transfer operation onto the paper 3 is finished.

In the above-described embodiment, the phase difference TP is calculated (measured) after rotation of the polygon motor 11 is stabilized. However, a predetermined phase difference may be stored in the ROM 25 as a factory default value.

In the above-described embodiment, the ASIC 22 and the CPU 24 are connected with each other outside the ASIC 22, However, the CPU 24 may be connected with the inside of the ASIC 22.

What is claimed is:

1. An image forming apparatus comprising:
- a laser-light generating section configured to generate laser light;
- a polygon mirror configured to deflect the laser light;
- a polygon motor configured to rotatably drive the polygon mirror;
- a light sensor configured to generate a detection signal upon receiving the laser light deflected by the polygon mirror;
- a rotation sensor provided at the polygon motor and configured to generate a rotation signal in synchronization with rotation of the polygon motor;
- a mirror-rotation-signal generating section configured to generate a mirror rotation signal in synchronization with rotation of the polygon mirror, based on the detection signal;
- a motor-rotation-signal generating section configured to generate a motor rotation signal in synchronization with rotation of the polygon motor, based on the rotation signal;
- a phase-difference measuring section configured to measure a phase difference between the motor rotation signal and the mirror rotation signal;
- a prediction-signal generating section configured to generate a prediction signal that is delayed from the motor rotation signal by the phase difference;
- a switching section configured to switch a control mode between: a mirror control mode in which the mirror rotation signal is used to control a rotational speed of the polygon mirror; and a prediction control mode in which the prediction signal is used to control the rotational speed of the polygon mirror; and
- a motor driver configured to drive the polygon motor in the control mode selected by the switching section;
- wherein, when printing is performed on both sides of a sheet, the switching section is configured to control the polygon motor in the prediction control mode during a period after printing is finished on one side of the sheet and before printing is started on another side of the sheet; and
- wherein, when the control mode is switched from the mirror control mode to the prediction control mode, the motor driver is configured to control the laser-light generating section to stop generation of the laser light subsequent to switching of the control mode from the minor control mode to the prediction control mode.

2. The image forming apparatus according to claim 1, further comprising a stopping section configured to control the laser-light generating section to stop generation of the laser light if the switching section switches from the mirror control mode to the prediction control mode.

3. The image forming apparatus according to claim 2, further comprising a reverse conveying section configured to perform a reverse conveying operation of conveying, in a reversed state, a recording medium on which an image is formed, wherein, at a start of the reverse conveying operation, first, the switching section is configured to switch from the mirror control mode to the prediction control mode, and subsequently the stopping section is configured to control the laser-light generating section to stop generation of the laser light.

4. The image forming apparatus according to claim 3, wherein, at an end of the reverse conveying operation, first, the laser-light generating section is configured to start generation of the laser light, and subsequently the switching section is configured to switch from the prediction control mode to the mirror control mode.

5. The image forming apparatus according to claim 1, further comprising:

a reverse conveying section configured to perform a reverse conveying operation of conveying, in a reversed state, a recording medium on which an image is formed;

a photosensitive member configured to be scanned by the laser light deflected by the polygon mirror;

a first medium detection sensor provided at a downstream side of the photosensitive member in a medium conveying path and configured to output a first medium detection signal upon detecting passage of the recording medium; and a second medium detection sensor provided at an upstream side of the photosensitive member in the medium conveying path and configured to output a second medium detection signal upon detecting passage of the recording medium, wherein, at the reverse conveying operation, the switching section is configured to switch the control mode from the mirror control mode to the prediction control mode upon receiving the first medium detection signal, and to switch the control mode from the prediction control mode to the mirror control mode upon receiving the second medium detection signal.

6. The image forming apparatus according to claim 1, wherein the motor rotation signal is a signal including, per unit time, a number of pulses that is proportional to the rotational speed of the polygon motor;

wherein the mirror rotation signal is a signal including, per unit time, a number of pulses that is proportional to the rotational speed of the polygon mirror; and wherein a number of pulses of the motor rotation signal that are generated per rotation of the polygon motor is equal to a number of pulses of the mirror rotation signal that are generated per rotation of the polygon mirror.

7. The image forming apparatus according to claim 1, wherein the phase-difference measuring section is configured to measure the phase difference between the motor rotation signal and the mirror rotation signal when a rotational speed of the polygon motor reaches a target speed and the rotational speed of the polygon motor is controlled in the mirror control mode.

8. An electrophotographic-type image forming apparatus comprising:

a photosensitive member;

an exposure device comprising:

a laser diode configured to generate laser light;

a polygon mirror configured to deflect the laser light; and a polygon motor configured to rotatably drive the polygon mirror, the exposure device being configured to irradiate the laser light onto the photosensitive member to expose the photosensitive member;

a rotation sensor configured to output a rotation detection signal upon detecting rotation of the polygon motor;

a light sensor provided at a position at which the laser light deflected by the polygon mirror can be detected, and configured to output a light detection signal upon detecting the laser light; and a motor controlling device connected with the rotation sensor and with the light sensor, the motor controlling device comprising:

a motor-rotation-signal generating section configured to generate a motor rotation signal indicative of a rotational speed of the polygon motor, based on the rotation detection signal outputted by the rotation sensor; and a mirror-rotation-signal generating section configured to generate a mirror rotation signal indicative of a rotational speed of the polygon mirror, based on the light detection signal outputted by the light sensor, wherein the motor controlling device is configured to control the polygon motor based on a control mode selected from two modes of: a first control mode in which the motor rotation signal is used to control the polygon motor; and a second control mode in which the minor rotation signal is used to control the polygon motor;

wherein, when printing is performed on both sides of a sheet, the motor controlling device is configured to control the polygon motor in the first control mode during a period after printing is finished on one side of the sheet and before printing is started on another side of the sheet; and wherein, when the control mode is switched from the second control mode to the first control mode, the motor controlling device is configured to control the laser diode to stop generation of the laser light subsequent to switching of the control mode from the second control mode to the first control mode.

9. The image forming apparatus according to claim 8, wherein, when the control mode is switched from the first control mode to the second control mode, the motor controlling device is configured to control the laser diode to start generation of the laser light prior to switching of the control mode from the first control mode to the second control mode.

10. The image forming apparatus according to claim 8, wherein, when printing is performed on a plurality of sheets, the motor controlling device is configured to control the polygon motor in the first control mode during a period after printing is finished on one sheet and before printing is started on a subsequent sheet.

11. The image forming apparatus according to claim 8, wherein the motor rotation signal is a signal including, per unit time, a number of pulses that is proportional to the rotational speed of the polygon motor;

wherein the mirror rotation signal is a signal including, per unit time, a number of pulses that is proportional to the rotational speed of the polygon mirror; and wherein a number of pulses of the motor rotation signal that are generated per rotation of the polygon motor is equal to a number of pulses of the mirror rotation signal that are generated per rotation of the polygon mirror.

12. The image forming apparatus according to claim 8, further comprising:

a phase-difference measuring section configured to measure a phase difference between the motor rotation signal and the mirror rotation signal; and a phase adjusting section configured to shift a phase of the motor rotation signal to match a phase of the mirror rotation signal if the phase difference exists, wherein, in the first control mode, the motor controlling device is configured to control the polygon motor by using the motor rotation signal of which the phase is adjusted to match the phase of the mirror rotation signal by the phase adjusting section.

13. The image forming apparatus according to claim 12, wherein the phase-difference measuring section is configured to measure the phase difference between the motor rotation signal and the mirror rotation signal when the rotational speed of the polygon motor reaches a target speed and the rotational speed of the polygon motor is controlled in the second control mode.

14. The image forming apparatus according to claim 8, further comprising:

a phase-difference storing section that stores a phase difference between the motor rotation signal and the mirror rotation signal; and a phase adjusting section configured to shift a phase of the motor rotation signal to match a phase of the mirror rotation signal, wherein, in the first control mode, the motor controlling device is configured to control the polygon motor by using the motor rotation signal of which the phase is adjusted to match the phase of the mirror rotation signal by the phase adjusting section.

15. An image forming apparatus comprising:

a laser-light generating section that generates laser light;

a polygon mirror that deflects the laser light;

a polygon motor that rotatably drives the polygon mirror;

a light sensor that generates a detection signal upon receiving the laser light deflected by the polygon mirror;

a rotation sensor provided at the polygon motor and configured to generate a rotation signal in synchronization with rotation of the polygon motor;

a controller that generates a mirror rotation signal in synchronization with rotation of the polygon mirror based on the detection signal, that generates a motor rotation signal in synchronization with rotation of the polygon motor based on the rotation signal, that measures a phase difference between the motor rotation signal and the mirror rotation signal, that generates a prediction signal that is delayed from the motor rotation signal by the phase difference, and that switches a control mode between: a mirror control mode in which the mirror rotation signal is used to control a rotational speed of the polygon mirror; and a prediction control mode in which the prediction signal is used to control the rotational speed of the polygon mirror; and a motor driver that drives the polygon motor in the control mode determined by the controller;

wherein, when printing is performed on both sides of a sheet, the controller is configured to control the polygon motor in the prediction control mode during a period after printing is finished on one side of the sheet and before printing is started on another side of the sheet; and wherein, when the control mode is switched from the mirror control mode to the prediction control mode, the motor driver is configured to control the laser-light generating section to stop generation of the laser light subsequent to switching of the control mode from the mirror control mode to the prediction control mode.

* * * * *